(12) United States Patent  
Foster

(10) Patent No.: US 8,885,046 B1
(45) Date of Patent: Nov. 11, 2014

(54) SEMI-TRAILER WITH EXTERNAL SWITCH

(75) Inventor: Robert Foster, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 1709 days.

(21) Appl. No.: 12/169,422

(22) Filed: Jul. 8, 2008

(51) Int. Cl.
*H04N 7/18* (2006.01)
*G08B 13/00* (2006.01)
*F21V 7/04* (2006.01)
*B60R 9/00* (2006.01)

(52) U.S. Cl.
USPC ........... 348/148; 340/574; 362/549; 296/37.6

(58) Field of Classification Search
CPC    B60R 11/04; B60R 2300/8006; B60R 11/06; G08B 21/0297; B60Q 1/2619
USPC ........................................................ 348/148
See application file for complete search history.

(56) References Cited

U.S. PATENT DOCUMENTS

| | | | |
|---|---|---|---|
| 3,961,323 A | 6/1976 | Hartkorn | |
| 5,346,233 A | 9/1994 | Moser | |
| 5,577,522 A | 11/1996 | Barkley et al. | |
| 5,628,541 A | 5/1997 | Gardner | |
| 6,019,432 A * | 2/2000 | Bonerb | 298/24 |
| 6,043,661 A | 3/2000 | Gutierrez | |
| 6,259,475 B1 * | 7/2001 | Ramachandran et al. | 348/148 |
| 6,276,736 B1 * | 8/2001 | Cook et al. | 296/37.6 |
| 6,827,534 B2 | 12/2004 | Onken | |
| 6,873,261 B2 * | 3/2005 | Anthony et al. | 340/574 |
| 2002/0158968 A1 * | 10/2002 | Leitgeb | 348/151 |
| 2004/0119822 A1 * | 6/2004 | Custer et al. | 348/148 |
| 2005/0068417 A1 | 3/2005 | Kreiner et al. | |
| 2007/0285270 A1 * | 12/2007 | Gunn et al. | 340/693.6 |
| 2009/0129112 A1 * | 5/2009 | Shamitz et al. | 362/549 |
| 2009/0230644 A1 * | 9/2009 | Stanley | 280/43 |

OTHER PUBLICATIONS

Foster, R., U.S. Appl. 12/169,445, filed Jul. 8, 2008, "Camera Installation for Trailer".
Foster, R., U.S. Appl. No. 12/169,398, filed Jul. 8, 2008, "Sting Trailer".

* cited by examiner

*Primary Examiner* — Phuoc Nguyen
*Assistant Examiner* — Kishin G Belani
(74) *Attorney, Agent, or Firm* — Nixon & Vanderhye P.C.

(57) ABSTRACT

A semi-trailer has a surveillance system located within a hidden compartment of the semi-trailer. At least one external switch is located on an exterior of the semi-trailer and is electrically coupled to at least one subsystem of the surveillance system for controlling the at least one subsystem without controlling the entire surveillance system at once.

22 Claims, 5 Drawing Sheets

SEMI-TRAILER WITH EXTERNAL SWITCH

FIELD

The present disclosure relates generally to semi-trailer surveillance and, in particular, the present disclosure relates to a semi-trailer having one or more switches disposed on an exterior thereof

BACKGROUND

Cargo theft from cargo transportation containers, such as semi-trailers, is prevalent. Thefts can occur when a semi-trailer is left unattended, such as when the semitrailer is parked at a rest-stop. Thefts may be perpetrated by employees of a receiver of the cargo as the employees unload the cargo. Thefts may also be perpetrated by the driver of the tractor that tows the semi-trailer.

To apprehend and prosecute thieves of cargo from semi-trailers, some semi-trailers are equipped with a surveillance system, e.g., including individual surveillance subsystems, such as camera systems with one or more cameras, microphone systems with one or more microphones, global positioning systems, etc. Such semi-trailers are sometimes referred to as "sting trailers."

The surveillance system typically transmits (e.g., wirelessly) signals to monitoring and/or recording equipment located at a remote site, such as a surveillance vehicle. Monitoring and recording surveillance subsystems with one or more monitors and one or more recorders may also be located on board the sting trailer as part of the surveillance system. An example monitoring subsystem includes one or more speakers and/or one or more video displays, and an example recording subsystem includes one or more audio and/or one or more video recorders.

Sting trailers are designed to simulate an actual semi-trailer so as to avoid arousing the suspicion of would-be thieves. Therefore, the surveillance system is hidden within the sting trailer. For example, the monitoring and recording subsystems, cameras, microphones, global positioning equipment, power supplies, etc. may be hidden in a hidden compartment located near the front of the sting trailer between a false end-wall and the actual front end-wall.

Sting trailers typically employ subsystem control switches, such as on/off power switches for selectively supplying power to and removing power from the individual surveillance subsystems. The subsystem power switches are typically hidden within the sting trailer, e.g., in the hidden compartment. A system control switch (e.g., often called a master switch), such as an on/off power switch, is sometimes located on the exterior of the sting trailer for selectively supplying power to and removing power from the entire surveillance system, e.g., all of the surveillance subsystems at once.

Sometimes it is desirable to operate fewer than all of the individual surveillance subsystems, e.g., to conserve power. However, hiding subsystem power switches within the sting trailer (e.g., in the hidden compartment) makes it difficult to access subsystem power switches to remove power from or restore power to the individual surveillance subsystems, especially when the sting trailer is loaded with cargo. Although the master switch is located on the exterior and is easily accessed, the master switch can only remove power from or restore power to all of the surveillance subsystems at once.

Some sting trailers have rechargeable surveillance systems that involve connecting an outlet of the surveillance system to an external power source for recharging. However, these outlets are typically hidden within the sting trailer, e.g., in the hidden compartment, and are difficult to access, especially when the sting trailer is loaded with cargo.

The hidden compartment is typically accessed by removing the false end-wall or a portion thereof, e.g., using a tool, such as a screwdriver, wrench, pliers, or the like. It is usually desirable to keep the tool with the sting trailer. However, leaving the tool where it can be easily detected can arouse suspicion about the nature of a trailer.

For the reasons stated above, and for other reasons stated below which will become apparent to those skilled in the art upon reading and understanding the present specification, there is a need in the art for alternative switch and recharging systems and alternative tool placement schemes for sting trailers.

SUMMARY

An embodiment provides a semi-trailer. The semi-trailer has a surveillance system located within a hidden compartment of the semi-trailer. At least one external switch is located on an exterior of the semi-trailer and is electrically coupled to at least one subsystem of the surveillance system for controlling the at least one subsystem without controlling the entire surveillance system at once.

DETAILED DESCRIPTION

Figure 1:
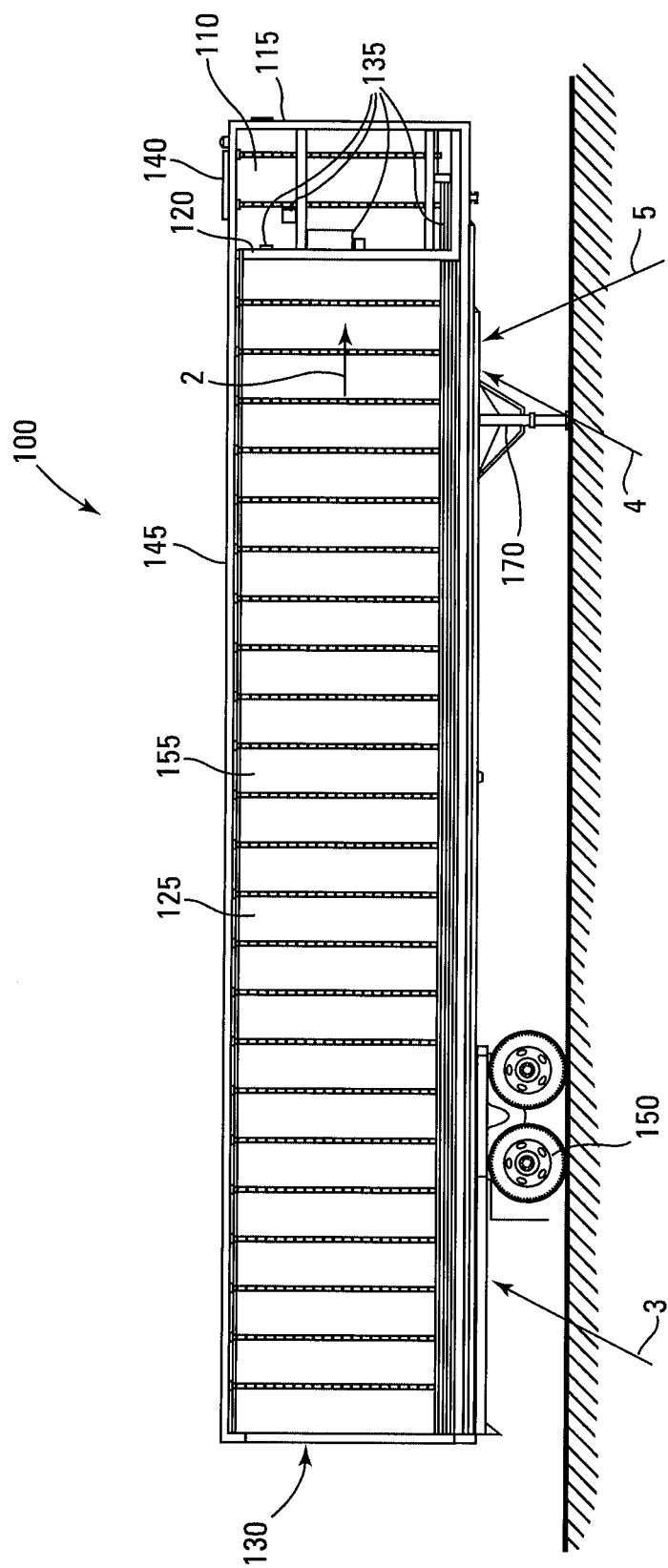
FIG. 1 is a side cutaway view of an embodiment of a sting trailer, according to an embodiment of the present invention.

In the following detailed description, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural and/or electrical changes may be made without departing from the scope of the present disclosure. The following detailed description is, therefore, not to be taken in a limiting sense, and the scope of the present disclosure is defined only by the appended claims and equivalents thereof.

FIG. 1 is a side cutaway view of a sting trailer 100, e.g., configured to operate as a semi-trailer, having a sidewall removed to reveal the interior of sting trailer 100. For one embodiment, the sting trailer 100 described in the various embodiments below is constructed from a conventional semi-trailer.

Sting trailer 100 may have a hidden compartment 110 located between a front end-wall 115 (e.g., sometimes called the nose of the trailer) and a false end-wall 120 and a cargo-carrying compartment 125 located between false end-wall 120 and a rear end 130 of sting trailer 100. For example, false end-wall 120 is added to an existing semi-trailer for forming hidden compartment 110 as part of constructing sting trailer 100.

A surveillance system 135 that may include individual surveillance subsystems, such as a camera system with one or more cameras, a microphone system with one or more microphones, a global positioning system, a closed circuit television system, a recording system with audio and/or video recorders, power supplies, rechargeable batteries, access routers, cabinets containing electrical equipment, etc., is located within hidden compartment 110. Solar panels 140 may be located on an exterior of a roof 145 of sting trailer 100, overlying hidden compartment 110, as shown in FIG. 1. Solar panels 140 may be used to power the surveillance system 135 or to provide back-up power to surveillance system 135 and are thus electrically coupled to surveillance system 135.

Figure 2:
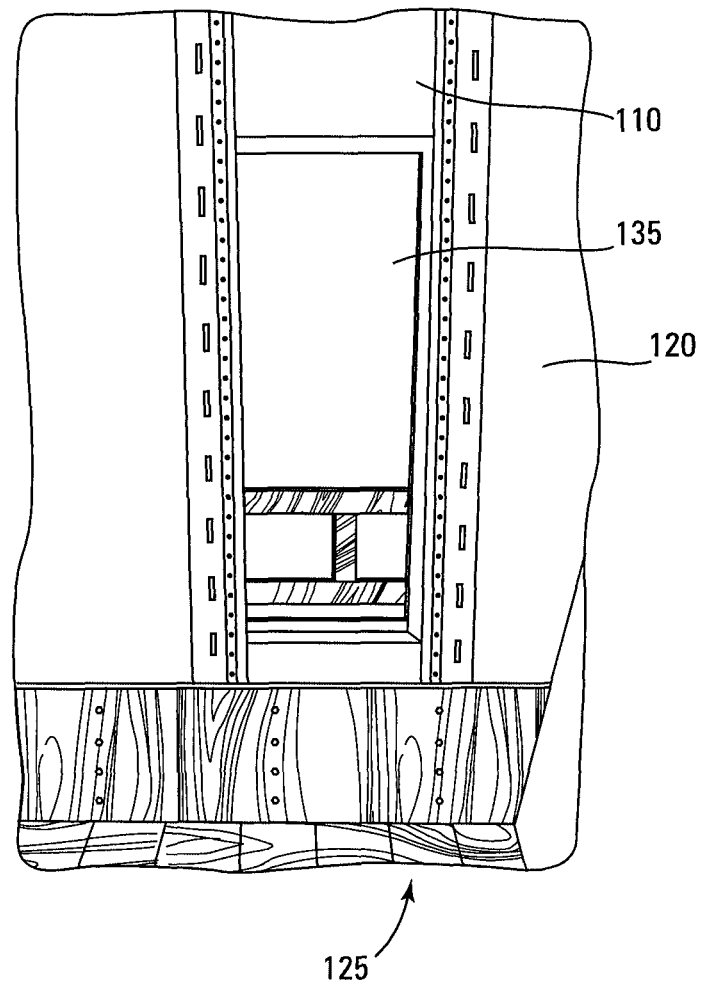
FIG. 2 is an interior view of a false end-wall of a sting trailer with a portion removed for accessing a hidden compartment of the sting trailer, according to another embodiment of the present invention.
Figure 3:
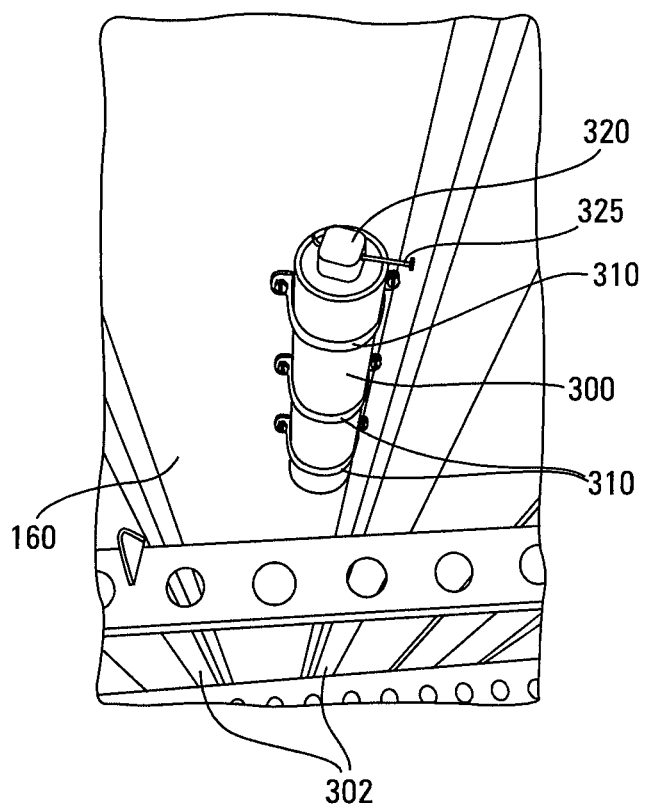
FIG. 3 illustrates an embodiment of an external tool container mounted on an under exterior of an embodiment of a sting trailer, according to another embodiment of the present invention.

For one embodiment, hidden compartment 110, and thus surveillance system 135, may be accessed by removing at least a portion of false end-wall 120, as shown in FIG. 2, which illustrates a portion of false end-wall 120 viewed from within cargo-carrying compartment 125 in the direction of arrow 2 in FIG. 1. For example, the portion of false end-wall 120 can be removed and replaced using a single tool, such as a screwdriver, wrench, pliers, or the like, that may be hidden in a hidden external tool container 300 located on the under exterior (underside) of sting trailer 100, as generally indicated by arrow 3 in FIG. 1 and as shown in FIG. 3. For one embodiment, the tool is configured to remove the portion of false end-wall 120, e.g., by unfastening or removing fasteners, such as bolts or screws, that secure the portion of false end-wall 120 in place.

For one embodiment, tool container 300 may be set back from the sides, front, and rear of sting trailer 100 to reduce the likelihood of detection. For example, tool container 300 may be located between the rearmost wheels 150 of sting trailer 100 and rear end 130, as generally indicated by arrow 3 in FIG. 1, and between the sides 155 (FIG. 1) of sting trailer 100. Tool container 300 may be located between a pair of beams 302, where each beam spans the underside of sting trailer 100 from front to rear for supporting a floor 160 of sting trailer 100, according to another embodiment, to further reduce the likelihood of detection. Hiding the tool in hidden external tool container 300 keeps the tool with sting trailer 110 so that the tool is readily available. Hiding the tool in hidden external tool container 300 also reduces the likelihood of detection, which could arouse suspicion as to the true nature of sting trailer 100.

Tool container 300 may be of a material that is substantially resistant to corrosion by water and road-deicing chemicals, such as plastic. Tool container 300 may be secured to the underside of sting trailer 100, e.g., to an exterior surface of floor 160, by one or more straps 310, e.g., of a material that is substantially resistant to corrosion by water and road-deicing chemicals, such as plastic.

Access to the interior of container 300, and thus the tool contained therein, is provided by at least one removable cover. For example, a removable plug 320 may be threaded into at least one end of tool compartment 300. For another embodiment, plug 320 may be equipped with a handle, such as a pin 325 passing through plug 320, as shown in FIG. 3, to facilitate removal and installation of plug 320.

Figure 4:
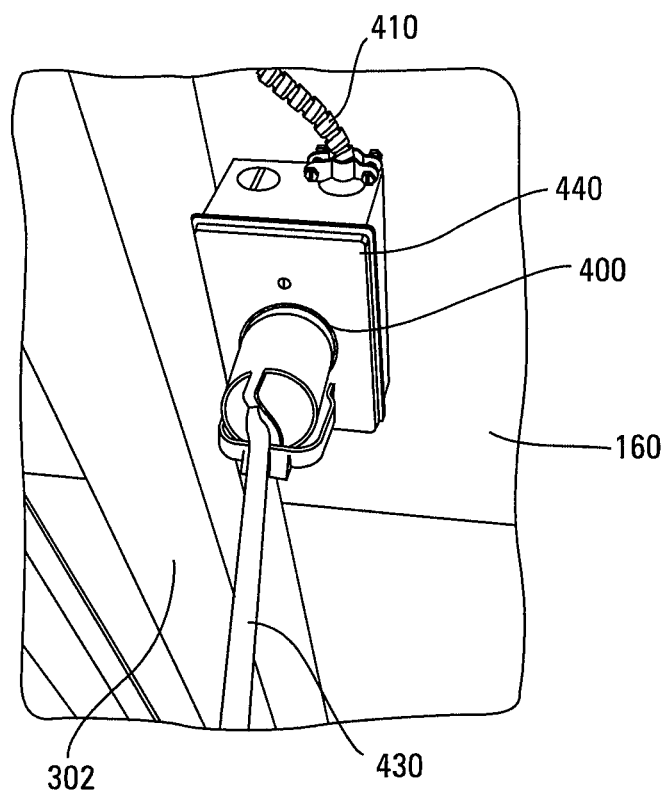
FIG. 4 illustrates an embodiment of an external electrical outlet mounted on an under exterior of an embodiment of a sting trailer, according to another embodiment of the present invention.

For some embodiments, surveillance system 135 (FIGS. 1 and 2) may include one or more rechargeable subsystems or components that are electrically coupled to a hidden external electrical outlet 400 located on the under exterior (underside) of sting trailer 100, as generally indicated by arrow 4 in FIG. 1 and as shown in FIG. 4. For example, the rechargeable subsystems or components may have integral rechargeable batteries that are electrically coupled to outlet 400, e.g. by wires that pass through a conduit 410. Alternatively, one or more components or subsystems may be electrically coupled to a rechargeable battery or an array of rechargeable batteries located within hidden compartment 135, separate from the components, and outlet 400 may be electrically coupled to the rechargeable battery or the array of rechargeable batteries, e.g. by the wires that pass through conduit 410. To recharge the one or more rechargeable subsystems or batteries of surveillance system 135, outlet 160 is electrically coupled to an external power source by an electrical cord 430.

Outlet 400 may be connected to a receptacle 440 that contains the electrical wires that pass through conduit 410. Receptacle 440 mounts outlet 400 on the underside of sting trailer 100 for one embodiment. For example, receptacle 440 and thus outlet 400 are secured to the exterior surface of floor 160 of sting trailer 100, as shown in FIG. 4. An optional cover (not shown) may be movably connected to receptacle 440, e.g., by hinges, for selectively covering and uncovering outlet 400. Receptacle 440 and the optional cover may be of a material that is substantially resistant to corrosion by water and road-deicing chemicals, such as plastic.

For one embodiment, outlet 400 is set back from the sides, front, and rear of sting trailer 100 to reduce the likelihood of detection. For example, outlet 400 may be located between the sides 155 (FIG. 1) of sting trailer 100 and between the front of sting trailer 100 and one or more support legs 170 connected to the underside of sting trailer 100 and configured to support sting trailer 100 when sting trailer 100 is disconnected from a tractor, as generally indicated by arrow 4 in FIG. 1. A leg 170 may be a leveling leg, e.g., a leveling jack, configured to support and level sting trailer 100. Outlet 400 may also be located between a pair of beams 302, one of which is shown in FIG. 4, where each beam 302 spans the underside of sting trailer 100 from front to rear for supporting floor 160 of sting trailer 100 (FIG. 3), according to a further embodiment.

Locating outlet 400 on the exterior of sting trailer 100 avoids the need to access hidden compartment 110 (FIGS. 1 and 2) for accessing an outlet for recharging the one or more rechargeable subsystems or components of surveillance system 135, as is typically done for existing conventional sting trailers. Moreover, hiding outlet 400 on the underside of sting trailer 100, as shown in FIG. 4, reduces the likelihood of detection, which could arouse suspicion as to the true nature of sting trailer 100.

For one embodiment, external switches 500 (shown in FIG. 5) may be hidden on the under exterior (underside) of sting trailer 100, as generally indicated by arrow 5 in FIG. 1. External switches 500 may be electrically coupled, one-to-one, to individual subsystems of surveillance system 135, such as the camera system, the microphone system, the global positioning system, the closed circuit television system, the recording system, etc., for respectively controlling the subsystems. For example, an external switch 500, e.g., switch 500$_1$, may be an on/off power switch (e.g., referred to as a subsystem power switch) for selectively supplying power to and removing power from (e.g., for selectively turning on and off power to) an individual subsystem of surveillance system 135. Another external switch 500, e.g., switch 500₂, may be an on/off subsystem power switch for selectively turning on and off power to another individual subsystem of surveillance system 135.

For one embodiment, one, or both, of switches 500₁ and 500₂ may each control the power for more than one of the subsystems, but not the entire surveillance system 135 at once. For example, switch 500₁ may turn on and off the power to the recording system and the global positioning system, etc. For one embodiment, a switch 500 may be a system control switch (e.g., often called a master switch), such as an on/off power switch, for controlling the power for the entire surveillance system 135 at once, e.g., by selectively turning on and off power to the entire surveillance system 135 at once.

Figure 5:
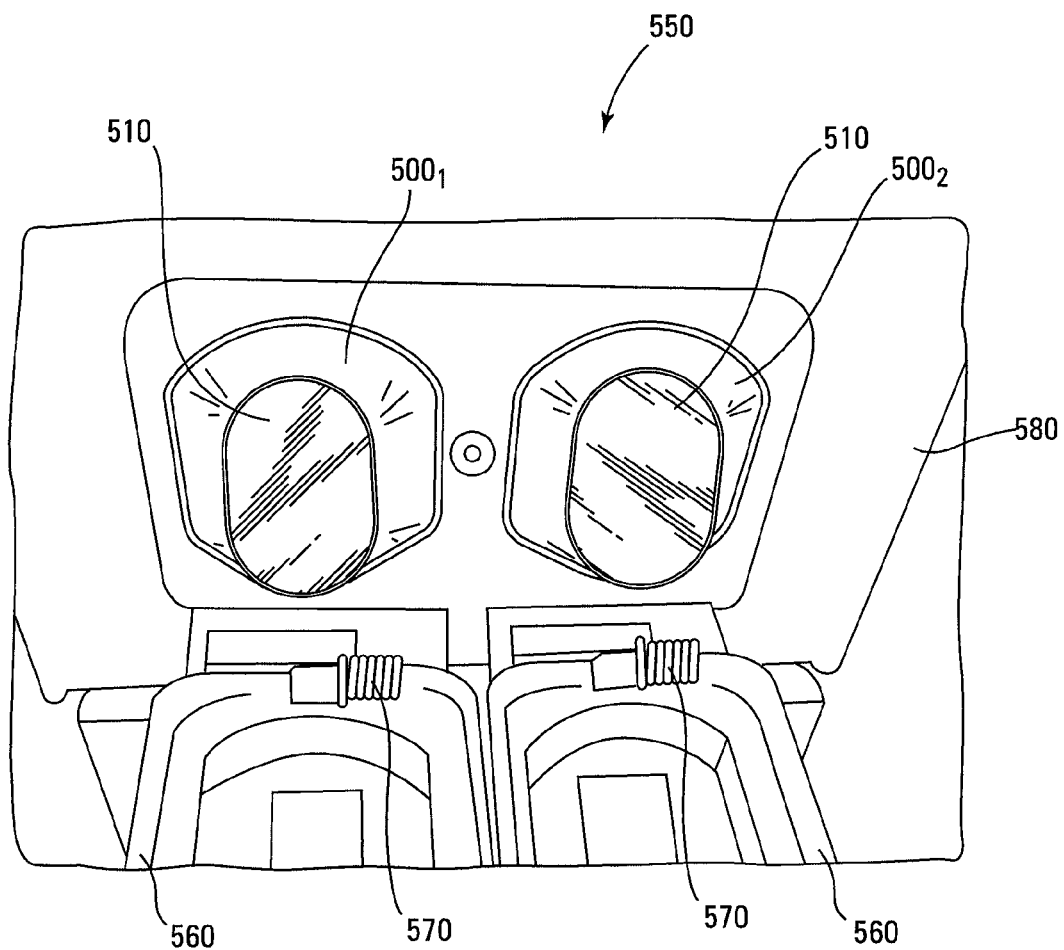
FIG. 5 illustrates an embodiment of external switches mounted on an under exterior of an embodiment of a sting trailer, according to another embodiment of the present invention.

Although only two switches are shown in FIG. 5, there may be an external switch 500 for controlling the power for each of the subsystems of surveillance system 135. For example, there may be as many external switches, e.g., in addition to a master switch, as there are individual subsystems of surveillance system 135, where the switches are electrically coupled, one-to-one, to the subsystems. Each of switches 500 may be a push-button switch, a lever switch, a toggle switch, or any other suitable on/off switch.

For one embodiment, each of switches 500 may have an integral lamp electrically coupled thereto, such as a lamp 510 shown in FIG. 5, that lights when the switch is ON and is capable of allowing current to flow therethrough and thus capable of allowing power to be supplied to one or more subsystems coupled to that switch 500. For other embodiments, the lamps may be separate from the respective switches 500.

For one embodiment, the respective switches 500 may form integral portions of a single external bank of multiple switches. For example, an external switch bank 550 may include a plurality of switches 500, as shown in FIG. 5. For another embodiment, the switches 500 of switch bank 550 may be electrically coupled, one-to-one, to the lamps 510, where the lamps 510 form part of switch bank 550.

For another embodiment, each of switches 500 may be selectively covered and uncovered by a respective one of covers 560. For example, covers 560 may be pivotally coupled to an exterior of each switch 500 or a bank of switches 500, as shown in FIG. 5. Springs 570, such as torsion springs, may spring load each cover 560 for biasing the respective covers 570 in the position of covering a respective one of the switches 500 (e.g., referred to here as the closed position). Each cover 560 may be configured to lock in the position of exposing a respective one of the switches 500 (e.g., referred to here as the open position), as shown in FIG. 5.

Each of switches 500 or switch bank 550 may be secured to the exterior surface of floor 160 of sting trailer 100, e.g., using a mounting plate. For example, switch bank 550 may be connected to a mounting plate 580 that mounts switch bank 550 on the exterior surface of floor 160, as shown in FIG. 5. Note that for one embodiment, covers 560 may be pivotally coupled to mounting plate 580, as shown in FIG. 5. For another embodiment, covers 560, mounting plate 580, the exterior of each switch 500, and the lenses of lamps 510 may be of a material that is substantially resistant to corrosion by water and road-deicing chemicals, such as plastic.

For one embodiment, the switches 500 are, or the switch bank 550 is, set back from the sides, front, and rear of sting trailer 100 to reduce the likelihood of detection. For example, the switches or switch bank may be located between the sides 155 (FIG. 1) of sting trailer 100 and between the front of sting trailer 100 and the one or more support legs 170, as generally indicated by arrow 5 in FIG. 1. In a manner similar to that shown in FIG. 3 for tool container 300, the switches or switch bank may be located between beams, such as the beams 302 shown in FIG. 3, that span the underside of sting trailer 100 from front to rear for supporting the floor of sting trailer 100.

Locating switches 500 on the exterior of sting trailer 100 avoids the need to access hidden compartment 110 (FIGS. 1 and 2) for accessing the switches for controlling one or more subsystems or components of surveillance system 135, as is typically done for existing conventional sting trailers. Moreover, hiding switches 500 on the underside of sting trailer 100 reduces the likelihood of detection, which could arouse suspicion as to the true nature of sting trailer 100.

CONCLUSION

Although specific embodiments have been illustrated and described herein it is manifestly intended that the scope of the claimed subject matter be limited only by the following claims and equivalents thereof.

What is claimed is:

1. A semi-trailer, comprising:
a main compartment including a cargo-carrying compartment and a hidden compartment that is hidden from view from the cargo-carrying compartment, the hidden compartment being separated from the cargo-carrying compartment by a false end wall, wherein the false end wall extends across an entire width and an entire height of the main compartment and has an appearance of a true end wall;
a surveillance system located entirely within the hidden compartment of the semi-trailer such that the surveillance system is concealed from individuals with access to the cargo carrying compartment, the surveillance system comprising one or more subsystems including at least one of a camera system with one or more cameras, a microphone system with one or more microphones, a global positioning system, a closed circuit television system, a recording system with audio and video recorders, power supplies, rechargeable batteries, and access routers;
at least one external switch located on an exterior of the main compartment and electrically coupled to at least one subsystem for controlling the at least one subsystem without controlling the entire surveillance system at once, the at least one external switch being a physical and manually operable switch; and
another external switch located on the exterior of the semi-trailer and electrically coupled to the surveillance system for controlling the entire surveillance system at once.

2. The semi-trailer of claim 1, further comprising a lamp electrically coupled to the at least one external switch.

3. The semi-trailer of claim 1, further comprising a cover coupled to an exterior of the at least one external switch for selectively covering and uncovering the at least one external switch.

4. The semi-trailer of claim 1, further comprising an external tool container located on the exterior of the semi-trailer.

5. The semi-trailer of claim 4, wherein the external tool container contains a tool for removing at least a portion of the false end wall.

6. The semi-trailer of claim 1, further comprising an external electrical outlet located on the exterior of the semi-trailer and electrically coupled to at least one rechargeable battery of the surveillance system.

7. The semi-trailer of claim 1, wherein the at least one external switch is hidden on the exterior of the main compartment.

8. The semi-trailer of claim 1, wherein the at least one external switch is located on an underside of the exterior of the main compartment.

9. The semi-trailer of claim 8, wherein the at least one external switch is set back from sides, a front, and a rear of the semi-trailer.

10. A sting trailer, comprising:
a hidden compartment containing a surveillance system comprising a plurality of subsystems including at least one of a camera system with one or more cameras, a microphone system with one or more microphones, a global positioning system, a closed circuit television system, a recording system with audio and video recorders, power supplies, rechargeable batteries, and access routers;
a cargo-carrying compartment;
a false end-wall interposed between the hidden compartment and the cargo-carrying compartment, the false end-wall extending across an entire width and an entire height of the cargo-carrying compartment and having an appearance of a true end wall, wherein the surveillance system is concealed from individuals with access to the cargo-carrying compartment; and
an external switch bank located on an exterior of the sting trailer, the switch bank comprising a plurality of on/off subsystem power switches, the on/off subsystem power switches electrically coupled, one-to-one, to the subsystems of the surveillance system, each on/off subsystem power switch configured to selectively turn on and off power to the subsystem electrically coupled thereto, wherein the external switch bank further comprises an on/off master power switch electrically coupled to the surveillance system and configured to selectively turn on and off power to the entire surveillance system at once.

11. The sting trailer of claim 10, wherein the external switch bank is located on an underside of the exterior of the sting trailer.

12. The sting trailer of claim 11, wherein the external switch bank is located between beams that span the underside of the exterior of the sting trailer for supporting a floor of the sting trailer.

13. The sting trailer of claim 12, wherein the external switch bank is located between a front of the sting trailer and one or more support legs connected to the underside of the exterior of the sting trailer.

14. The sting trailer of claim 10, wherein the on/off subsystem power switches are electrically coupled, one-to-one, to lamps of the switch bank, and wherein each lamp is configured to light when the on/off subsystem power switch electrically coupled thereto is ON.

15. The sting trailer of claim 10, wherein the external switch bank is hidden on the exterior of the sting trailer.

16. A method of constructing a sting trailer, comprising:
providing a semi-trailer with a hidden compartment defined by a false end wall within a cargo-carrying compartment, the false end wall extending across an entire width and an entire height of the cargo-carrying compartment and having an appearance of a true end wall;
disposing a surveillance system within the hidden compartment, and concealing the surveillance system from individuals with access to the cargo-carrying compartment;
disposing at least one external on/off switch on an exterior of the semi-trailer;
electrically coupling the at least one external on/off switch to at least one subsystem of the surveillance system for selectively turning on and off power to the at least one subsystem without turning on or off power to the entire surveillance system at once, the at least one subsystem including at least one of a camera system with one or more cameras, a microphone system with one or more microphones, a global positioning system, a closed circuit television system, a recording system with audio and video recorders, power supplies, rechargeable batteries, and access routers; and
disposing another external on/off power switch on the exterior of the semi-trailer and electrically coupling the other external on/off power switch to the surveillance system for selectively turning on and off power to the entire surveillance system of the sting trailer at once.

17. The method of claim 16, further comprising disposing an external tool container on the exterior of the semi-trailer.

18. The method of claim 17, further comprising disposing a tool within the external tool container, the tool configured to remove at least a portion of the false end-wall that closes the hidden compartment for accessing the hidden compartment.

19. The method of claim 17, further comprising disposing an external electrical outlet on the exterior of the semi-trailer and electrically coupling the external electrical outlet to one or more batteries of the surveillance system.

20. The method of claim 19, further comprising setting the at least one external on/off switch, the external tool container, and the external electrical outlet back from sides, a front, and a rear of the semi-trailer.

21. The method of claim 20, further comprising locating the at least one external on/off switch, the external tool container, and the external electrical outlet between a pair of beams on an underside of the exterior of the semi-trailer that span a length of the semi-trailer and that act to support a floor of the semi-trailer.

22. The method of claim 19, further comprising hiding the at least one external on/off switch, the external tool container, and the external electrical outlet on the exterior of the semi-trailer.

* * * * *